United States Patent
Agne

(10) Patent No.: US 7,616,339 B2
(45) Date of Patent: Nov. 10, 2009

(54) DATA TRANSMISSION SYSTEM HAVING DISTRIBUTED CONTROL FUNCTIONALITY

(75) Inventor: Werner Agne, Röthenbach (DE)

(73) Assignee: Siemens Aktiengesellschaft, Munich (DE)

( * ) Notice: Subject to any disclaimer, the term of this patent is extended or adjusted under 35 U.S.C. 154(b) by 719 days.

(21) Appl. No.: 09/925,004

(22) Filed: Aug. 8, 2001

(65) Prior Publication Data
US 2002/0171850 A1    Nov. 21, 2002

(30) Foreign Application Priority Data
May 2, 2001   (DE) ................ 101 21 322

(51) Int. Cl.
*G06K 15/00* (2006.01)
*G06K 9/38* (2006.01)

(52) U.S. Cl. ........................... 358/1.4; 710/100

(58) Field of Classification Search ............. 358/1.15, 358/1.13; 709/340, 204, 220; 710/100; 700/245, 700/182; 318/568.12, 568.16; 717/114, 717/174; 455/39
See application file for complete search history.

(56) References Cited

U.S. PATENT DOCUMENTS

| | | | | |
|---|---|---|---|---|
| 5,144,562 A | * | 9/1992 | Stikkelorum et al. | ........ 700/223 |
| 5,873,307 A | * | 2/1999 | Tenfelde et al. | ............. 101/248 |
| 5,947,023 A | * | 9/1999 | Bohrer et al. | ................ 101/181 |
| 6,343,549 B1 | * | 2/2002 | Tokiwa | ........................ 101/248 |
| 2002/0147866 A1 | * | 10/2002 | Agne | ......................... 710/100 |

FOREIGN PATENT DOCUMENTS

| | | |
|---|---|---|
| DE | 3914238 | 4/1989 |
| DE | 69009847 | 6/1994 |
| DE | 19853205 | 11/1998 |
| WO | 9711848 | 4/1997 |

* cited by examiner

*Primary Examiner*—Gabriel I Garcia
(74) *Attorney, Agent, or Firm*—King & Spalding L.L.P.

(57) ABSTRACT

A data transmission system with distributed control functionality for machine tools, production machines, and robots, having a plurality of control functional units, has a respectively networked movement control system which controls the operation of the control functional units in complex processes. Information relating to movement control can be interchanged by means of real-time cross-communication between the control functional units. An Ethernet link can be used for real-time cross-communication. The use of the data transmission system for printing machines also represents an advantageous application of the invention.

15 Claims, 1 Drawing Sheet

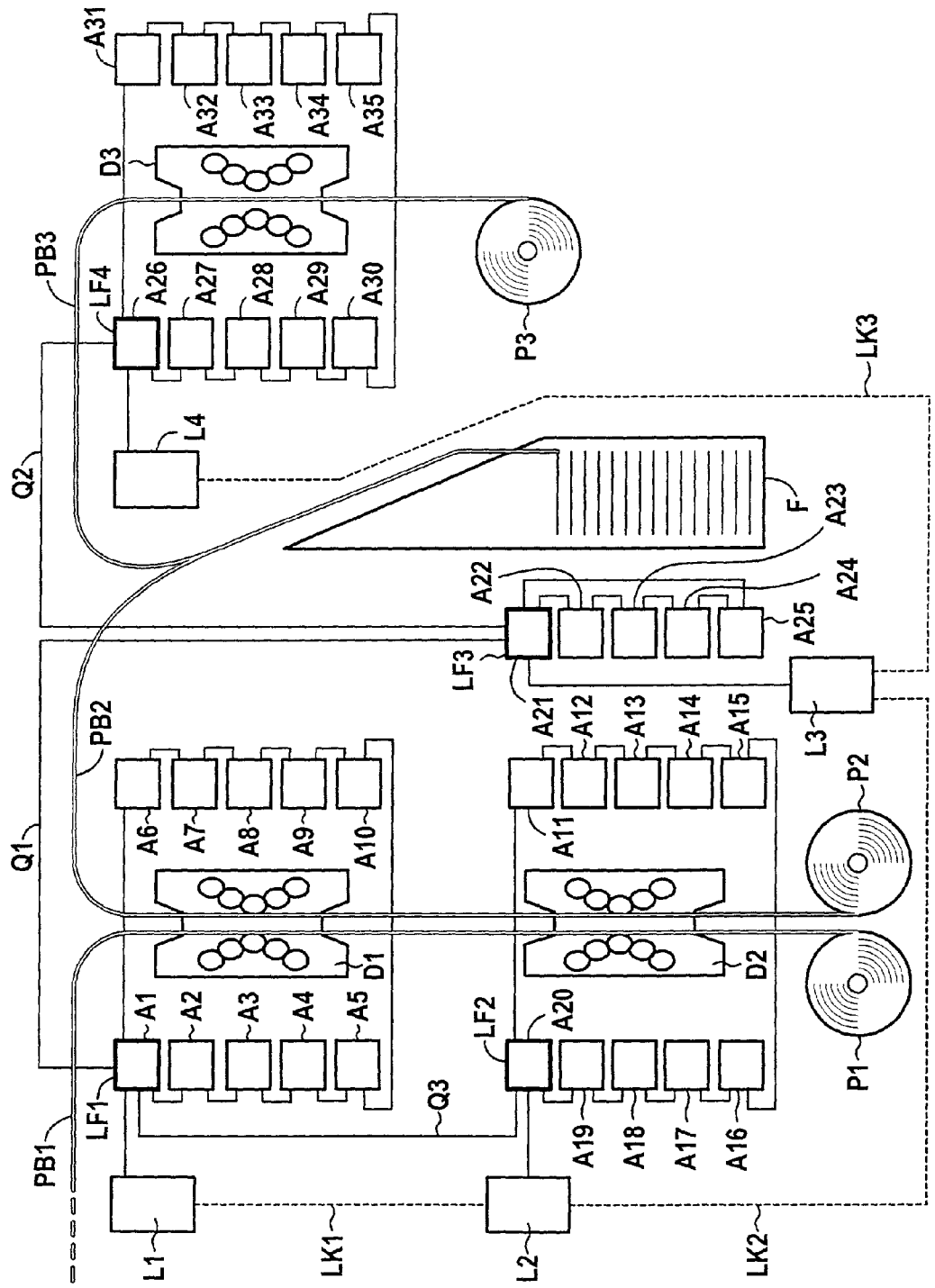

DATA TRANSMISSION SYSTEM HAVING DISTRIBUTED CONTROL FUNCTIONALITY

CROSS REFERENCE TO RELATED APPLICATION

This application claims priority to German application number 101 213 22.0 filed May 2, 2001.

FIELD OF THE INVENTION

The invention relates to a data transmission system having distributed control functionality for machine tools and production machines, and robots, hereinafter referred to generally as machines, and further having a networked movement control system which controls complex processes.

BACKGROUND OF THE INVENTION

A data transmission system which can be used for machine tools, production machines, and robots, is disclosed in the document "Standardisierter Feldbus für die elektrische Antriebstechnik" [Standardized fieldbus for electrical drive technology], VDI Reports 844, "SERCOS Interface" report, page 69 et seq. The SERCOS interface allows time-controlled bus access to drives. The data messages which are intended for the individual drives are in this case sent in a fixed time frame. An open-loop or closed-loop control system carries out the master function (control functionality) and sends a synchronization signal in time with the cycle time, in response to which the individual drives, i.e., the slaves (secondary functionality), transmit their information to the master.

A drive concept for a printing machine without a shaft is disclosed in WO 97/11848. There, information which ensures that the angles of the drives are synchronized during printing rotation is transmitted exclusively via a synchronization bus.

Today, it is becoming increasingly important to provide machines, such as machine tools, production machines, and robots, with a network data communications structure, in order to allow production data to be gathered, evaluated and distributed. It is also frequently necessary to match machine units or subunits, and robots, to one another in a production process.

SUMMARY OF THE INVENTION

The object of the present invention is to provide information for movement control systems, which simultaneously control complex processes in networked machine tools, production machines, and robots, in addition to existing data links. This object is achieved through the discovery that information relating to movement control can be interchanged by means of real-time, cross-communication between the control functional units. All movement control systems which control complex processes can thus react simultaneously to relevant events in a matched manner.

In a preferred embodiment of the present invention, real-time cross-communication is carried out using Ethernet links. Using Ethernet makes it is possible to use known bus protocols. Particularly when using fast Ethernet, the very short bus cycles used can result in a wider dynamic range due to the movement control system controlling the complex processes. The wider dynamic range advantageously makes it possible to stabilize process discrepancies more quickly.

In a further preferred embodiment of the present invention, the control functional units are synchronized by means of Ethernet real-time cross-communication. This enables the stringent requirements for synchronized running to be satisfied, since the master drives can be matched in real time.

In yet a further preferred embodiment of the present invention, data and synchronization signals from drive regulators are interchanged with an associated control functional unit using Ethernet real-time communication. Matching of all the drive regulators in a drive group using real-time Ethernet advantageously makes use of all the conventions defined in an Ethernet, and allows real-time matching of all the drives in a group. Thus, for example, high-precision and low-error position control actions can be carried out.

One preferred use of the present invention is in printing machines. In modern printing machines there are a range of individually driven rotating machine elements which are dependent on one another and are matched to one another. A disturbance in a driven machine element in a printing machine can thus also be reported immediately, that is to say in real time, to other machine elements. All movement control systems controlling complex processes can react simultaneously to the disturbance in a matched manner and, for example, can avoid paper jams and torn paper webs. Printing machine downtimes can thus be minimized.

DRAWINGS

The invention is described in greater detail below and in the context of the drawing, in which:

The single FIGURE is a schematic layout of a printing machine incorporating the invention.

DETAILED DESCRIPTION OF THE INVENTION

In the printing machine illustrated in the drawing, paper webs PB1 to PB3 run from paper rolls P1 to P3 through printing units D1 to D3, and to a folding apparatus F. After passing through the printing unit D1, the paper web PB1 also passes through further processing units; however, they are not shown in the drawing. Thus, in the drawing, the paper web PB1 ends in a dashed line.

Each printing unit D1 to D3 is represented in the illustration by an approximately H-shaped outer contour. The printing units D1 to D3 each contain ten cylinders, which are arranged in two groups of five cylinders each. The cylinders represent all the cylindrical or wheel-like machine elements in respective printing units D1 to D3. The paper webs PB1 to PB3 run via these cylinder groups, which constitute printing points in the printing units D1 to D3.

A printing point essentially comprises a rubber cylinder, a plate cylinder and an inking and moistening mechanism. Each printing point can print ink on one side. All the printing points whose printed paper webs PB1 to PB3 are passed to folding apparatus F, are included in a rotation process. In this case, the printing units D1 to D3 are normally accommodated in printing towers. Each individually driven cylinder has an associated drive with a respective drive regulator A1 to A35. Each group of drive regulators, A1 to A10, A11 to A20 and A26 to A35 of respective printing units D1 to D3 and A21 to A25 for the rotating machine elements of the folding apparatus F has one drive regulator, A1, A20, A21 and A26 with a control functionality LF1 to LF4, for each group. Each group of drive regulators are networked intrinsically in the form of a ring. However, an important feature is that an individual drive regulator A1, A20, A21 and A26 with control functionality LF1 to LF4, is available for each group. Any other data networking which can be carried out within a group is thus also possible. This also includes, for example, serial or star linking. The drive regulators A1, A20, A21 and A26 which have the control functionality LF1 to LF4, are represented by a rectangle drawn with a thicker line than the other regulators.

Each of the control functional units LF1 to LF4 is coupled to a respective one of associated control computers L1 to L4. The control computers L1 to L4 are networked in a control computer communication system by links LK1 to LK3 and illustrated in the drawing by dashed lines. Other embodiments of the data networking are also possible.

A control computer L1 to L4 carries out higher-level process organization and, in the process, normally defines data or parameters that are not time-critical. Thus, for example, the control computers L1 to L4 can be used to define the printing units D1 to D3 via which a paper webs PB1 to PB3 will run, and which drives are intended to run synchronously to one another.

In the event of a fault, an operator of a printing machine thus has flexibility to decide which of the printing units D1 to D3 will be used. However, this also requires the capability to pass information relating to movement control flexibly to individual printing units D1 to D3. According to the present invention, this is achieved by cross-communication Q1, Q2 and Q3. Cross-communication Q1 to Q3 is a data link with real-time capability and thus ensures that essential information is available at all movement control points simultaneously. This includes, for example, synchronization and error signals, and signals which necessitate immediate action.

In what follows, it is assumed that a specific fault in the folding apparatus F can be rectified by reducing the speed of the paper through the system. Once this fault has been detected, the drive A21 with the control functionality LF3 of the folding apparatus F transmits a speed reduction signal to other control functional units LF1, LF2 and LF4. The control functional units LF1, LF2 and LF4 know, via the control computers L1 to L4, which of drive regulators A1 to A35 are controlling the movement of the paper webs PB1 to PB3 to the folding apparatus F. The respective control functional units LF1, LF2 and LF4 signal the above-mentioned speed reduction to the appropriate drive regulators.

The cross-communication Q1 to Q3 in real-time means that all the control functional units LF1 to LF4 have this information at the same time. Once a fault has been identified and a counter measure has been initiated, this leads to an immediate reaction at the same time in the drive groups. This advantageously allows an improved printed product quality to be achieved.

Since all the control functional units LF1 to LF4 are connected by means of real-time cross-communication Q1 to Q3, this ensures that all the information relating to movement control is available all the time throughout the system. Even if the system operator has to reconfigure the system, in terms of the profile of the paper webs PB1 to PB3, as a result of a fault, there is nevertheless no need for him to carry out any rewiring for information distribution. In particular, complex, freely configurable production lines which use machine tools, production machines, and robots in the end profit from the real-time capability of the cross-communication Q1 to Q3. It is even conceivable for such flexibility to be made possible for the first time by the use of cross-communication Q1 to Q3 with a real-time capability.

I claim:

1. A data transmission system for use in a machine, comprising
a plurality of drive systems each comprising an associated control functional unit wherein each control functional unit only controls the drive system to which it is associated,
control computers associated to each drive system linked through a first control network and coupled with said control functional units to perform high level process control;
a second independent network interconnecting said control functional units for real time cross-communication there between,
whereby information relating to movement control from any one of said control functional units is transmitted in real time to all of the other of said control functional units.

2. The data transmission system according to claim 1, wherein the real-time cross-communication can be carried out using Ethernet links.

3. The data transmission system according to claim 1, wherein the control functional units can be synchronized by means of Ethernet real-time cross-communication.

4. The data transmission system according to claim 1, wherein data and synchronization signals from drive regulators can be interchanged with an associated control functional unit using Ethernet real-time communication.

5. The data transmission system according to claim 1, wherein the machine is a printing machine.

6. The data transmission system according to claim 1, wherein each drive system comprises a plurality of drive regulators coupled with each respective control functional unit.

7. The data transmission system according to claim 6, wherein the drive regulators of one drive system are linked through a third network selected from the group consisting of a ring network, a serial network, and a star network.

8. The data transmission system according to claim 7, wherein the third network is a real-time Ethernet network.

9. The data transmission system according to claim 1, wherein the first network is used to transmit non-time critical data or parameters.

10. The data transmission system according to claim 1, wherein each drive system comprises a plurality of drives and associated drive regulators arranged in a group, wherein all drive regulators arranged in a group are linked by an associated ring network.

11. A data transmission system for use in a printing machine having a distributed control functionality and a networked complex movement control, comprising:
a plurality of drive systems each having a plurality of drive regulators arranged in a group, wherein all drive regulators arranged in a group are linked by an associated ring network and each drive system comprises an associated control functional unit wherein each control functional unit only controls the drive system to which it is associated;
a plurality of control computers each coupled through a first control network with an associated control functional unit;
a second independent network interconnecting said control functional units for real time cross-communication there between,
whereby information relating to movement control from any one of said control functional units is transmitted in real time to all of the other of said control functional units through said second network.

12. The data transmission system according to claim 11, wherein the real-time cross-communication can be carried out using Ethernet links.

13. The data transmission system according to claim 11, wherein data as well as synchronization signals from the control functional units can be exchanged with said drive regulators by means of Ethernet real-time cross-communication.

14. A data transmission system for use in a machine having a plurality of drive systems, comprising
- a plurality of control functional units each control functional unit being associated to only one drive system,
- a plurality of control computers each control computer being associated to only one drive system and the plurality of control computers being linked through a control network and coupled with said control functional units to perform high level process control;
- an independent Ethernet network interconnecting said control functional units for real time cross-communication there between,
- whereby information relating to movement control from any one of said control functional units is transmitted in real time to all of the other of said control functional units.

15. A data transmission system for use in a printing machine having a distributed control functionality and a networked complex movement control, comprising:
- a plurality of drive systems each having a plurality of drive regulators arranged in a group, wherein all drive regulators arranged in a group are linked by an associated ring network and each drive system comprises an associated control functional unit wherein each control functional unit only controls the drive system to which it is associated;
- a plurality of control computers each coupled through a control network with an associated control functional unit;
- an independent Ethernet network interconnecting said control functional units for real time cross-communication there between,
- whereby information relating to movement control from any one of said control functional units is transmitted in real time to all of the other of said control functional units through said Ethernet network.

* * * * *